US012708869B2

(12) United States Patent
Immel et al.

(10) Patent No.: US 12,708,869 B2
(45) Date of Patent: Aug. 18, 2026

(54) FLUID FILTER RETENTION MECHANISM

(71) Applicant: CATERPILLAR INC., Peoria, IL (US)

(72) Inventors: Jon Tyler Immel, Chillicothe, IL (US); Stephen Ellis Oedewaldt, Mapleton, IL (US); Philip Carl Spengler, Washington, IL (US); Brian John Sutton, Edwards, IL (US); Tony Lynn Alwardt, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 699 days.

(21) Appl. No.: 18/132,561

(22) Filed: Apr. 10, 2023

(65) Prior Publication Data

US 2024/0207763 A1 Jun. 27, 2024

Related U.S. Application Data

(60) Provisional application No. 63/434,981, filed on Dec. 23, 2022.

(51) Int. Cl.
*B01D 35/30* (2006.01)

(52) U.S. Cl.
CPC ........ *B01D 35/30* (2013.01); *B01D 2201/291* (2013.01); *B01D 2201/31* (2013.01)

(58) Field of Classification Search
CPC .............. B01D 35/30; B01D 2201/291; B01D 2201/31; B01D 2201/0415; B01D 2201/295; B01D 29/13; B01D 46/2414; B01D 2201/4046; B01D 2265/028
USPC ............. 210/232, 450, 493.2, 455, 442, 444
See application file for complete search history.

(56) References Cited

U.S. PATENT DOCUMENTS

| | | | |
|---|---|---|---|
| 6,500,335 B2 | 12/2002 | Stanadyne | |
| 6,554,140 B2 | 4/2003 | Steger, Jr. et al. | |
| 7,934,617 B2 | 5/2011 | Minowa et al. | |
| 8,057,669 B2 | 11/2011 | Beard et al. | |
| 9,821,256 B2 | 11/2017 | Narvaez et al. | |
| 10,786,767 B2 | 9/2020 | Cummins | |
| 2006/0157403 A1 | 7/2006 | Harder et al. | |
| 2015/0090653 A1* | 4/2015 | Kotale | B01D 35/30 210/236 |
| 2021/0170316 A1 | 6/2021 | Abdalla et al. | |

FOREIGN PATENT DOCUMENTS

| | | |
|---|---|---|
| WO | 2015050580 | 4/2015 |

* cited by examiner

*Primary Examiner* — Madeline Gonzalez

(57) ABSTRACT

An endcap for a filter element includes an annular plate member disposed adjacent an axial end surface of an annular filter medium of the filter element. A radially outer annular flange projects axially from a surface of the annular plate member. The radially outer annular flange includes a winglet feature extending radially outwardly in a cantilever fashion from an outer circumferential surface of the radially outer annular flange in a direction opposite to a direction in which the filter element is rotated during installation into a filter base of a filter system, with the winglet feature deflecting toward the outer circumferential surface of the radially outer annular flange through contact with a wedge-shaped protrusion projecting radially inwardly from an inner circumference of the filter base as the filter element is rotatably installed into the filter base, and springing back to its undeflected configuration after passing the wedge-shaped protrusion.

20 Claims, 12 Drawing Sheets

224
222
62
12
32
64
228
226

222
62
224
12
228
64
226
120

62
12
222
46
92
48
228
64
226

FLUID FILTER RETENTION MECHANISM

TECHNICAL FIELD

The present disclosure relates to filters and, more particularly, to a fluid filter retention mechanism.

BACKGROUND

Cartridge style fluid filters, such as, for example, fuel or lubricant filters associated with an engine, typically include a replaceable filter element contained within a canister that is threadingly engaged to the engine. Unfiltered fluid, e.g., fuel or lubricant, is received by the filter via an inlet port, particulates are removed from the unfiltered fluid via the filter element, and filtered fluid is delivered to the engine via an outlet port. The filter element often includes a generally cylindrical filter medium, e.g., fabric or other porous material, supported within the canister via one or more endcaps, such that unfiltered fluid flows through the filter medium in a generally radial direction. An endcap typically supports and/or positions the filter medium within the canister and with respect to the inlet and outlet ports. Fluid filters usually also include one or more seals that sealingly separate the inlet and outlet ports to reduce or eliminate unfiltered fluid from bypassing the filter medium.

Typically, the filter elements of such fluid filters are frequently replaced to reduce pressure drop across the filter medium, avoid deterioration of the seals, and/or otherwise attempt to ensure the fluid filter operates as desired. To replace a filter element, the canister is usually unthreaded from the engine, the seals between the inlet and outlet flows are unseated, the old filter element is removed from the canister, a new filter element is inserted, and the canister is rethreaded on the engine. An operator replacing a filter cartridge might prime the canister with fluid to avoid and/or reduce entrapped air within the fluid system. This priming fluid is often previously used and/or unfiltered fluid and priming the canister may require great care to avoid priming fluid from being placed on the downstream side, i.e., the filtered fluid side, of the filter medium. Additionally, proper reseating of the seals, either the old seals or new seals, during filter cartridge replacement is desirable to provide sufficient sealing between the inlet and outlet ports and, thus, to reduce unfiltered fluid from bypassing the filter medium. When reinstalling an existing canister with a new filter element, or in the case of a "spin-on" type filter cartridge, wherein the canister and filter element are replaced as a unit, it would be desirable to provide an easy way for an operator to recognize that the canister with the new filter element or the spin-on type filter cartridge has been threadedly engaged with the filter base on an engine to the proper amount of tightening such that the seals are properly reseated and a leak-tight installation has been achieved. Unfiltered and/or priming fluid downstream of the filter medium, either from insufficient sealing and/or from operator priming, may result in damage to one or more engine components during operation.

U.S. Pat. No. 6,554,140 ("the '140 patent") issued to Steger, Jr. et al. discloses a filter assembly including an outer seal that forms a seal between an outer shell and a filter base and an inner seal that forms a seal between an endcap and the filter base. The filter assembly is threadingly attached to the filter base via a nutplate that compresses the outer seal against the filter base. The filter assembly also includes a filter element wherein unfiltered fluid flows from an unfiltered fluid passageway to a radial space between the outer shell and the filter element, unfiltered fluid flows through the filter element into an inner passageway, and the resulting filtered fluid flows into a filtered fluid passageway.

The '140 patent may provide a seal between the filter assembly and the filter base with the outer seal and may provide a seal to minimize fluid leakage at a connection between the filtered fluid passageway and the inner passage with the inner seal. The '140 patent may, however, require numerous components to achieve these seals, complicating the assembly and alignment that may require precise manufacturing tolerances thereof and/or potentially reduce the sufficiency of the seal. Additionally, it may be difficult for an operator to reconnect the filter assembly of the '140 patent to the filter base, while ensuring that the filter element has been tightened the proper amount and the inner and outer seals have been properly reseated.

The present disclosure is directed to overcoming one or more of the shortcomings set forth above.

SUMMARY

In one aspect, the present disclosure is directed to an endcap for a filter element. The endcap includes an annular plate member disposed adjacent an axial end surface of an annular filter medium of the filter element. A radially outer annular flange projects axially from a surface of the annular plate member. The radially outer annular flange includes at least one winglet feature extending radially outwardly in a cantilever fashion from an outer circumferential surface of the radially outer annular flange in a direction opposite to a direction in which the filter element is rotated during installation into a filter base of a filter system, with the at least one winglet feature being configured to deflect toward the outer circumferential surface of the radially outer annular flange through contact with a wedge-shaped protrusion projecting radially inwardly from an inner circumference of the filter base as the filter element is rotatably installed into the filter base, and spring back to its undeflected configuration after passing the wedge-shaped protrusion.

In another aspect, the present disclosure is directed to a filter element including an annular filter medium and an endcap including an annular plate member disposed adjacent an axial end surface of the annular filter medium. A radially outer annular flange projects axially from a surface of the annular plate member. The radially outer annular flange includes at least one winglet feature extending radially outwardly in a cantilever fashion from an outer circumferential surface of the radially outer annular flange in a direction opposite to a direction in which the filter element is rotated during installation into a filter base of a filter system, with the at least one winglet feature being configured to deflect toward the outer circumferential surface of the radially outer annular flange through contact with a wedge-shaped protrusion projecting radially inwardly from an inner circumference of the filter base as the filter element is rotatably installed into the filter base, and spring back to its undeflected configuration after passing the wedge-shaped protrusion.

In yet another aspect, the present disclosure is directed to a filter system including a filter base configured for connection of the filter system to a vehicle or other machine, the filter base including an inlet port for introduction of unfiltered fluid, an outlet port for discharge of filtered fluid, a wedge-shaped protrusion projecting radially inwardly from an inner circumferential surface of the filter base, and a backstop protrusion circumferentially spaced from the wedge-shaped protrusion and projecting radially inwardly from the inner circumferential surface of the filter base. A filter cartridge including an annular filter medium is connected to the filter base. A top endcap of the filter cartridge disposed at one axial end of the annular filter medium includes a radially outer annular flange projecting axially from the top endcap. The radially outer annular flange includes at least one winglet feature extending radially outwardly in a cantilever fashion from an outer circumferential surface of the radially outer annular flange in a direction opposite to a direction in which the filter cartridge is rotated during installation to the filter base of the filter system, with the at least one winglet feature being configured to deflect toward the outer circumferential surface of the radially outer annular flange of the filter cartridge through contact with the wedge-shaped protrusion as the filter cartridge is rotatably installed into the filter base, and the at least one winglet feature being configured to spring back to its undeflected configuration after passing the wedge-shaped protrusion and before contacting the backstop protrusion.

DETAILED DESCRIPTION

Figure 1:
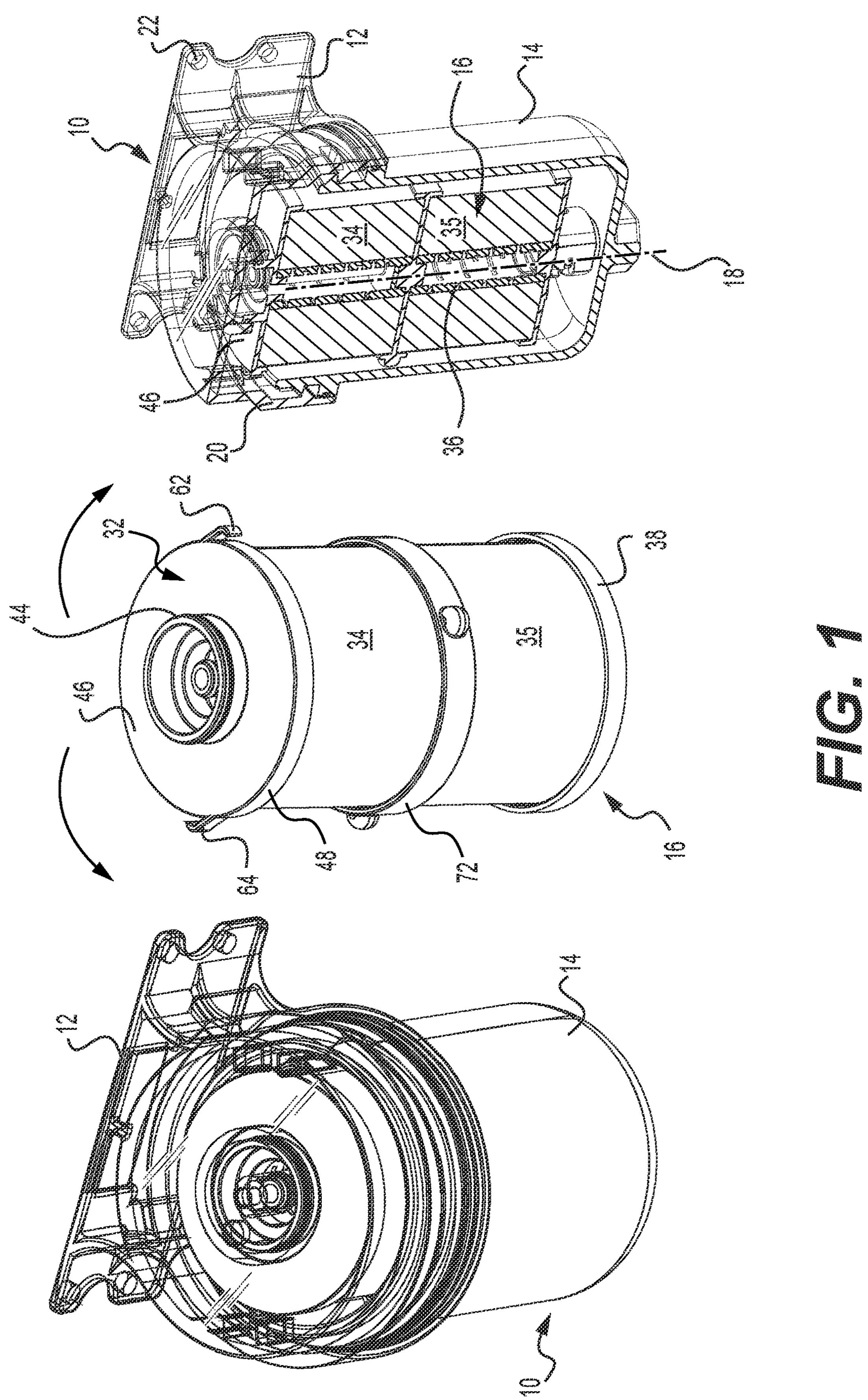
FIG. 1 is a diagrammatic illustration of an exemplary filter base and canister, filter element, and fluid filter with the filter element installed in the canister and attached to the filter base in accordance with the present disclosure.

FIGS. 1 and 2A-2C illustrate an exemplary fluid filter system 10. The fluid filter system 10 may include a base 12, a canister 14, a filter element 16, and a central longitudinal axis 18. The filter system 10 may be one of several components within a fluid system and may be configured to receive unfiltered fluid from one or more upstream components of the fluid system, trap particles suspended within the unfiltered fluid, i.e., filter the fluid, and provide filtered fluid to one or more downstream components of the fluid system. The fluid system may include any type of fluid system, e.g., a fuel delivery system, a lubricating system, and/or a coolant system, and may or may not be operatively associated with an engine (not shown). Additionally, the fluid filter system 10 may be configured to filter any type of fluid, such as, for example, gasoline, diesel fuel, lubricating oil, water, coolant, and/or any other type of fluid. The fluid of the fluid system may or may not be pressurized and, if so, may be at any pressure. According to some embodiments, for example, the embodiment shown in FIGS. 1 and 2A—2C, the canister 14 and the filter element 16 may be formed as separate parts, such that the canister 14 is separate from the filter element 16, and the filter element 16 is configured to be received in the canister 14 and removed from the canister 14 for servicing or replacement. In alternative embodiments, for example, the embodiment shown in FIG. 9, a canister 114 and a filter element with a top endcap-like portion 132 may be formed as a disposable cartridge 100. Such embodiments may be configured such that the canister 114 is part of the filter element, the assembly is coupled to a filter base 312 (see FIG. 10) in a "spin-on" fashion, and the entire assembly of the canister and the filter element including filter media, in the form of a "spin-on" style cartridge, is disposed of when replacing the filter element. In the "spin-on" style cartridge of FIG. 9, at least one winglet, or a plurality of winglets such as two diametrically opposed winglets 162, 164 may protrude in a cantilever fashion from an outer circumferential surface of an annular flange that extends axially from a top endcap-like portion 132 of the cartridge with an annular plate disposed adjacent the filter media contained within the canister 114 of the disposable cartridge 100.

Figure 9:
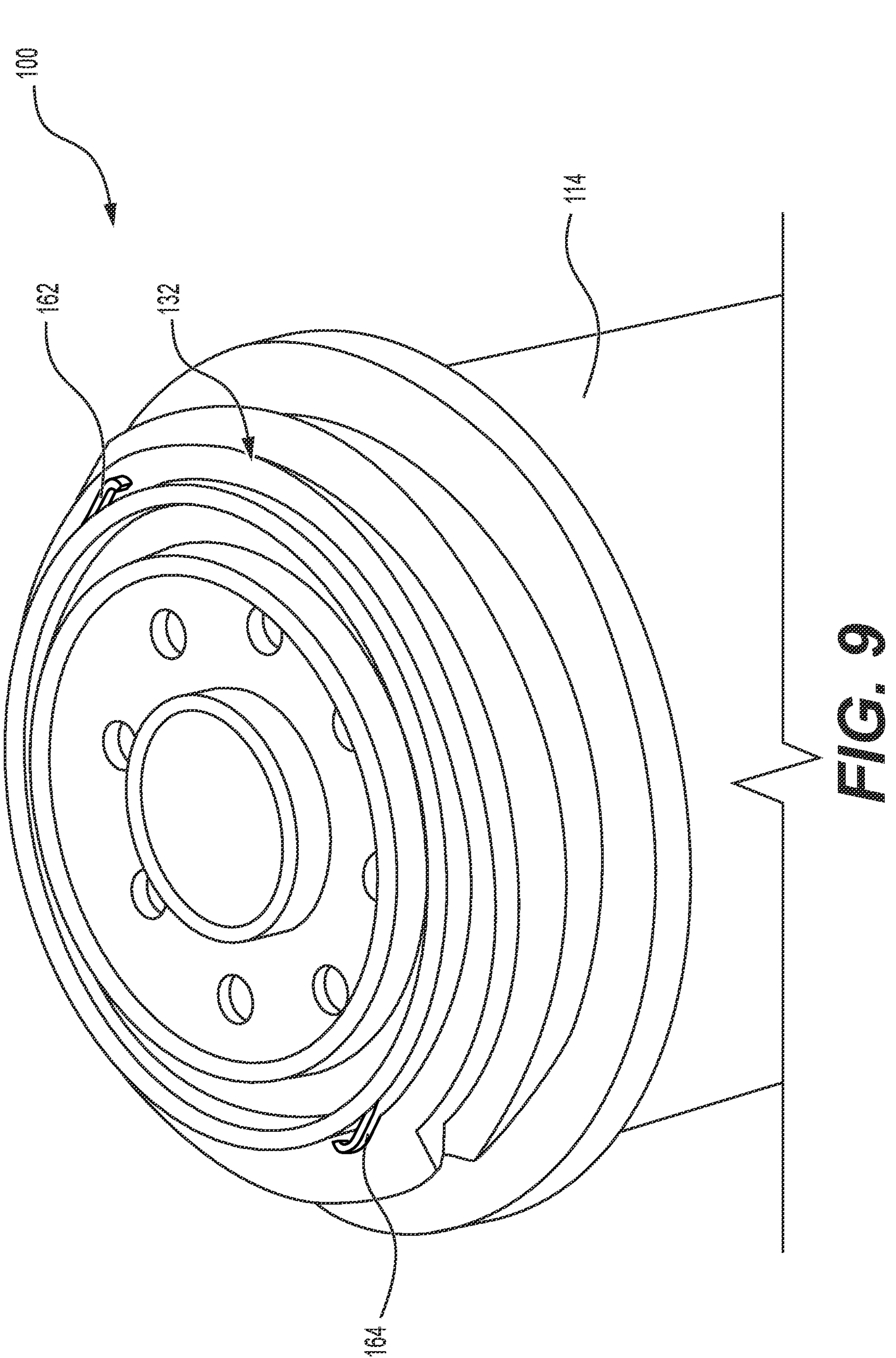
FIG. 9 is an alternative embodiment of a spin-on style filter cartridge with winglets protruding radially outward from the filter element.
Figure 10:
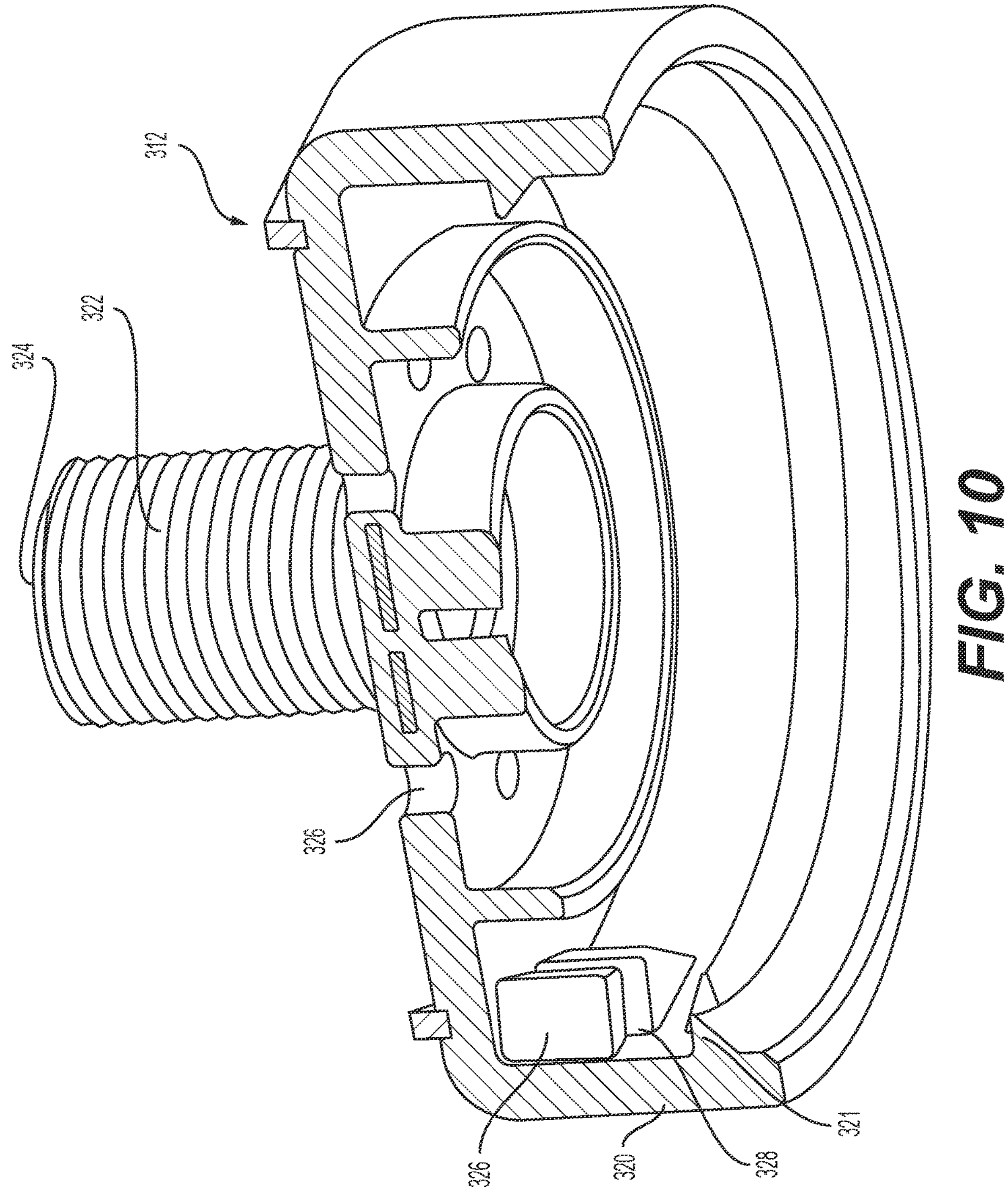
FIG. 10 is an isometric view of an exemplary filter base configured for threaded engagement with the spin-on style filter cartridge of FIG. 9, and provided with a threaded boss for engagement with an engine or other machinery.

The base 12 for receiving the canister 14 may include an outer wall 20 and a mounting portion 22. The outer wall 20 may be substantially cylindrical in shape and may include internal threads 21 configured to threadingly engage external threads 31 included on the canister 14. Similarly, as shown in FIG. 10, a filter base 312 for receiving the "spin-on" style cartridge 100 of FIG. 9, may include an outer wall 320 and a mounting portion 322, which may be an externally threaded, hollow pipe stud configured for threaded engagement with an engine or other machinery. An inner circumferential surface of the outer wall 320 of the filter base 312 shown in FIG. 10 may include at least one pair of a circumferentially-spaced wedge-shaped protrusion 328 and backstop protrusion 326 protruding radially inwardly from the inner circumferential surface of the outer wall 320. The winglets 162, 164 of the spin-on style cartridge 100 of FIG. 9 may be configured to be radially deflected toward the cartridge as the cartridge 100 is threadedly engaged with the internal threads 321 of the filter base 312. The mounting portion 22, 322 may be configured to connect the fluid filter system 10 to, for example, an engine, via one or more bolt holes or via the external threads of the hollow pipe stud 322. The base 12, 312 may further define an inlet port 24, 324 and an outlet port(s) 26, 326. The inlet port 24, 324 may be configured to receive unfiltered fluid from one or more upstream components of the fluid system and may be configured to direct the unfiltered fluid toward the filter element 16 (or integral filter medium within the spin-on style. Specifically, the inlet port 24, 324 may include a generally cylindrical space within the base 12, 312 and with respect to a central, longitudinal axis 18 of the filter element 16 and the canister 14 (or spin-on, disposable cartridge 100). The outlet port(s) 26, 326 may be configured to receive filtered fluid from the filter element 16 and configured to direct the filtered fluid toward one or more downstream components of the fluid system. Specifically, the outlet port 26 or one or more outlet ports 326 of the spin-on style cartridge 100 may define a generally annular space, or a series of circumferentially-spaced ports arranged around the inlet port 324, with respect to the longitudinal axis 18 and may be disposed radially surrounding the inlet port 24, 324 in the base 12, 312. In various alternative embodiments, the inlet and outlet ports 24, 324, and 26, 326 may each define a space within the base 12, 312 having any shape and/or contour, e.g., multifaceted, and may be formed in the base 12, 312 in conjunction with different shaped manifolds or fluid passageways (not shown).

Figure 2A:
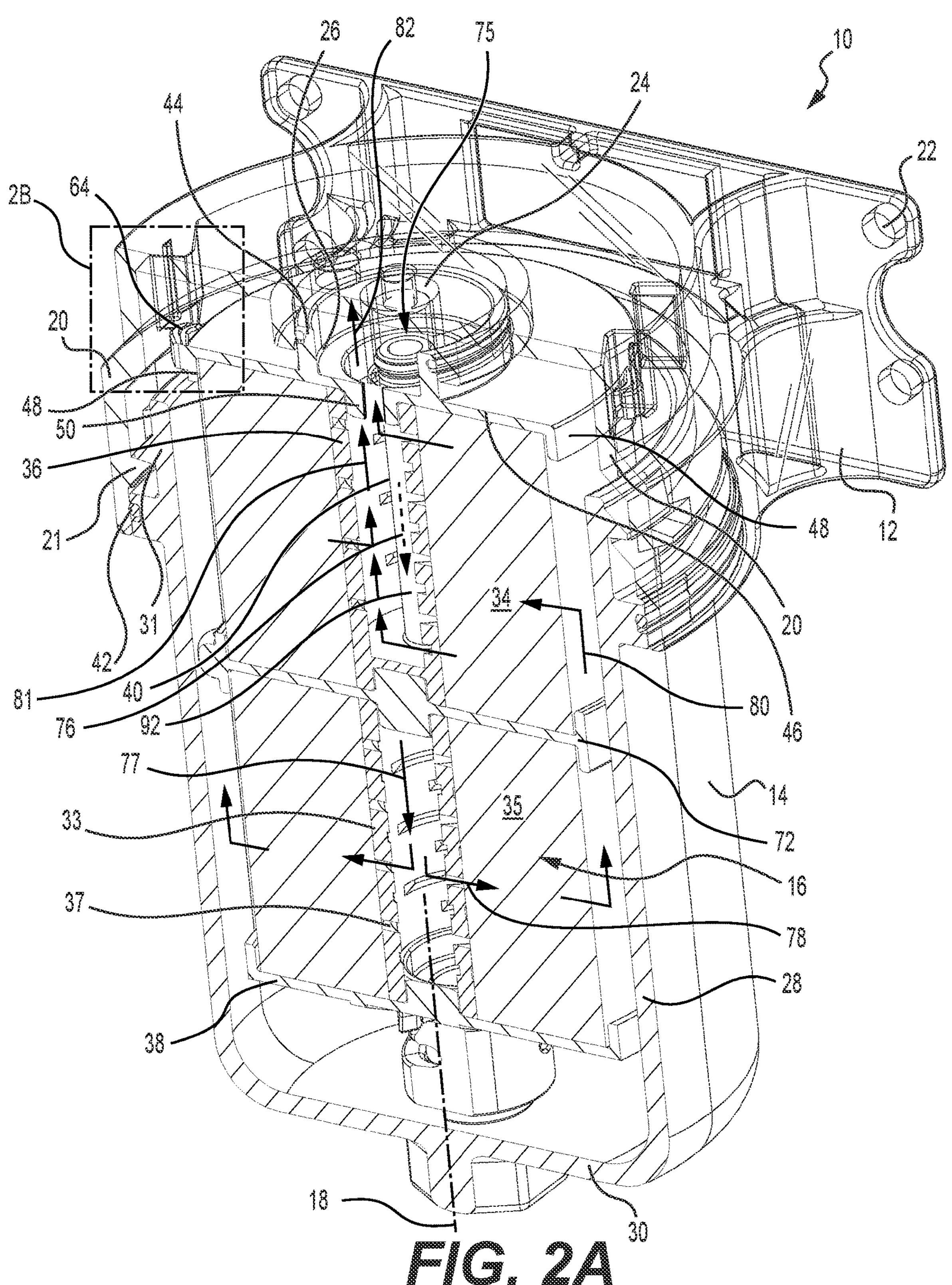
FIG. 2A is an enlarged, partially sectional diagrammatic illustration of the exemplary fluid filter of FIG. 1.
Figure 2B:
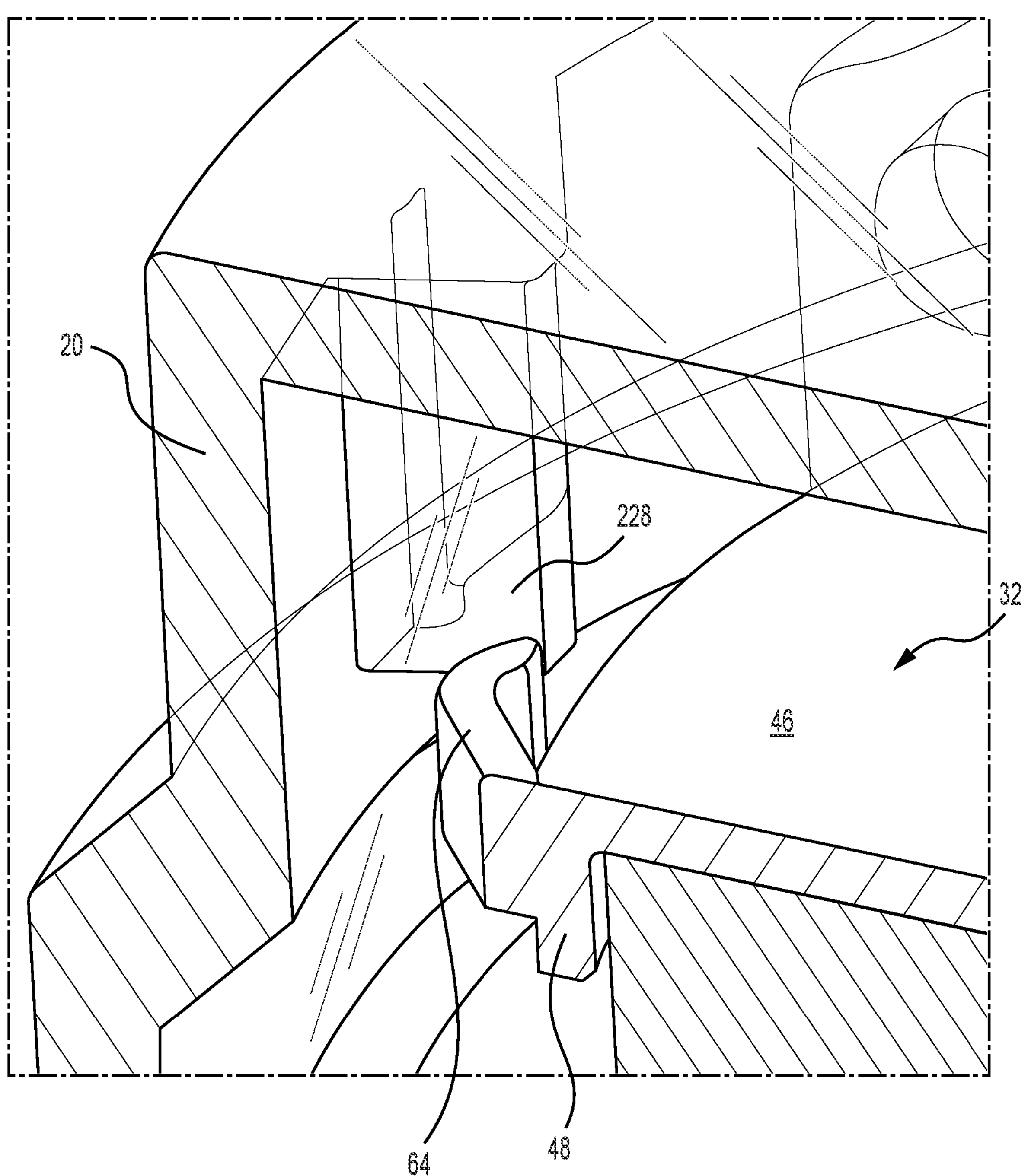
FIG. 2B is an enlarged, sectional diagrammatic illustration of a portion of FIG. 2A, showing a winglet protruding radially outward in a cantilevered fashion from an outer circumferential flange of a filter element endcap.
Figure 2C:
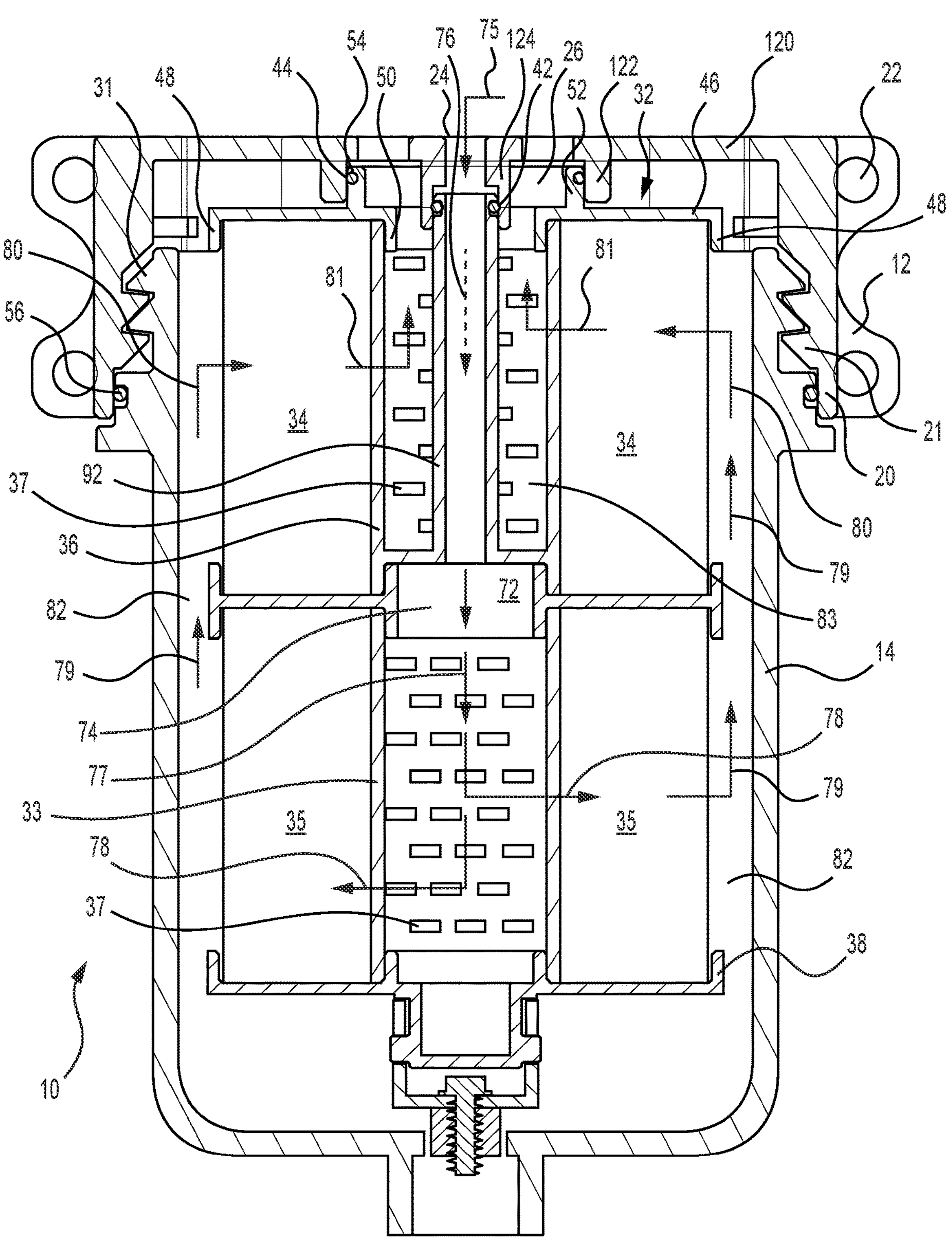
FIG. 2C is a cross-sectional elevation view of the fluid filter of FIG. 1.
Figure 3:
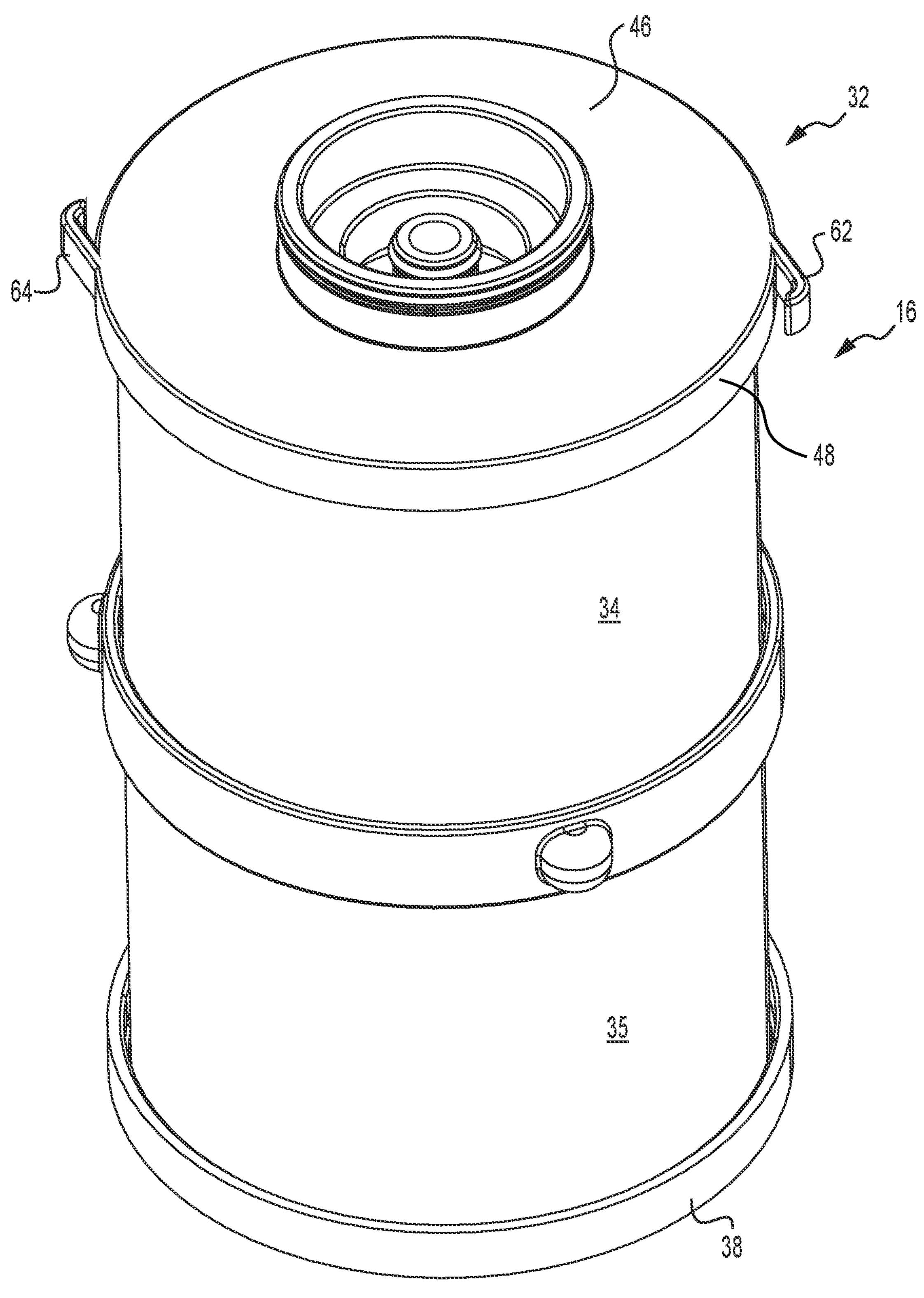
FIG. 3 is an isometric view of an exemplary filter element according to this disclosure.

An alternative embodiment of the base 12, 312 may reverse the flow direction of fluid through the filter element 16, or through the spin-on, disposable cartridge 100, with the inlet port 24, 324 being defined, for example, where the outlet port(s) 26, 326 is/are defined in the exemplary embodiments shown in FIGS. 2A and 10, and with the outlet port(s) 26, 326 being defined, for example, where the inlet port 24, 324 is defined in the exemplary embodiment shown in the figures. In such an alternative embodiment, the inlet port 24, 324 may include a generally annular space within the base 12, or an array of circumferentially spaced openings arranged radially outwardly from an outlet port, with respect to the longitudinal axis 18. The outlet port(s) 26, 326 may be configured to receive filtered fluid from the filter element 16 or spin-on style cartridge 100 and configured to direct the filtered fluid toward one or more downstream components of the fluid system. Specifically, the outlet port(s) 26, 326 may include a generally cylindrical space with respect to the longitudinal axis 18 and may be disposed radially centrally to a generally annular inlet port or plurality of circumferentially-spaced inlet ports. In such an alternative embodiment, unfiltered fluid would flow in the opposite direction to the flow arrows shown in FIGS. 2A and 2C. Unfiltered fluid would enter the annular inlet port, flow axially into the center of an upper cylindrical tube 36 disposed radially within a first, upper annular filter medium 34 (in some embodiments flowing axially along an outer periphery of an inner tube 92 disposed concentrically within the upper cylindrical tube 36, rather than through the center of the inner tube 92 as shown in FIGS. 2A and 2C). The fluid would then flow radially outward through openings 37 in the upper cylindrical tube 36, through the first annular filter medium 34, axially down around an outer periphery of the first annular filter medium 34, radially inward through a lower annular filter medium 35, through openings 37 in a lower cylindrical tube 33, and then axially upward through a central opening 74 in an intermediate barrier 72 separating the lower annular filter medium 35 from the upper annular filter medium 34, through the center of the inner tube 92, and out of the outlet port 26. One of ordinary skill in the art will recognize that still further alternative embodiments of the filter element 16 may include, for example, only one annular filter medium surrounding a single cylindrical tube rather than an upper and a lower annular filter medium surrounding an upper and a lower cylindrical tube with an intermediate barrier between the upper and lower annular filter medium.

Canister 14 may include an outer wall 28 and a lower endwall 30. The outer wall 28 may be substantially cylindrical in shape and may include external threads 31 along a top portion of an outer periphery of the canister, the external threads 31 being configured to threadingly engage internal threads 21 formed along an inner circumferential surface of a lower portion of the outer wall 20 of the base 12. The lower endwall 30 may be disposed at an end of the outer wall 28 opposite the external threads 31 that engage the canister 14 with the base 12. The outer wall 28 and the endwall 30 may generally define an internal cavity configured to contain the filter element 16. The internal threads 21 and the external threads 31 may each, respectively, extend in either a clockwise or counter-clockwise direction. The canister 14 may include any conventional drain port (not referenced) that may be configured to facilitate draining of fluid from the canister 14 and/or may include any conventional relief valve (not shown) to limit a pressure of the fluid of the fluid system. It is understood that the engagement between the internal threads 21 and the external threads 31 and the resulting frictional engagement therebetween are well known in the art and, thus, are not further described.

The filter element 16 may include a first endcap 32 and a first annular filter medium 34 extending around the upper cylindrical tube 36. The first endcap 32 may include a generally ring-shaped wall 46 disposed against a top surface of the first annular filter medium 34, a radially outer flange 48 extending perpendicular to the ring-shaped wall 46 in a downward direction toward the lower endwall 30 of the canister 14 parallel to the central longitudinal axis 18 of the filter element 16 and overlapping the outer circumferential perimeter of the first filter medium 34, a radially inner flange 50 extending perpendicular to the ring-shaped wall 46 in a downward direction toward the lower endwall 30 of the canister 14 and overlapping an inner diameter of a top end of the upper cylindrical tube 36, and a central flange extending perpendicular to the ring-shaped wall 46 from an intermediate region of the ring-shaped wall 46 in an upward direction opposite to the direction of the radially inner flange 50 and the radially outer flange 48.

An intermediate barrier 72 may be coupled to a bottom end of the upper cylindrical tube 36 and include an intermediate barrier aperture 74 therethrough. The intermediate barrier 72 may be disposed between the upper cylindrical tube 36 surrounded by the upper annular medium 34 and the lower cylindrical tube 33 surrounded by the lower annular medium 35. The first endcap 32 may be disposed adjacent the base 12 and may be configured to support the filter medium of the filter element 16 within, and with respect to, the canister 14.

The upper and lower annular filter medium 34, 35 may have different filtering characteristics from each other. According to some embodiments, one of the first filter medium 34 and the second filter medium 35 may include a coalescing-type media configured to promote separation of a first fluid from a second fluid having different characteristics than the first fluid as a fluid including the first fluid and the second fluid passes through the one of the first filter medium 34 and the second filter medium 35. According to some embodiments, the fluid to be filtered includes water and fuel, wherein the first fluid is water and the second fluid is fuel. The fuel may be diesel fuel or any fuel known to those skilled in the art. Other combinations of first and second fluids are contemplated.

In the exemplary embodiments shown, either the first filter medium 34 or the second filter medium 35 may be a coalescing-type media configured to promote separation of a first fluid from a second fluid having different characteristics than the first fluid, such that one of the first fluid and the second fluid coalesces into droplets as it passes through the coalescing-type media, and such that the droplets of the first fluid form on the downstream surface of the coalescing-type media. According to some embodiments, the other of the first filter medium 34 and the second filter medium 35 may be a barrier-type media configured to separate the first fluid from the second fluid before the fluid passes through the barrier-type media, such that droplets of the first fluid form on the upstream surface of the barrier-type media, and the second fluid passes through the barrier-type media. As explained below, according to some embodiments, the first filter medium 34 may be a coalescing-type media, and the second filter medium 35 may be a barrier-type media, and alternatively, according to some embodiments, the second filter medium 35 may be a coalescing-type media, and the first filter medium 34 may be a barrier-type media. Coalescing-type media and/or barrier-type media known to those skilled in the art are contemplated.

In the exemplary embodiment shown in FIGS. 2A and 2C, the first filter medium 34 may include a barrier-type media, and the second filter medium 35 may include a coalescing-type media. As identified by the arrows in FIG. 1, the filter element 16 may be configured such that fluid 75 entering the filter element 16 through the inlet port 24 flows through the internal diameter of the inner tube 92 along flow path 76, passes through the intermediate barrier aperture 74 of intermediate barrier 72, flows along the internal diameter of the lower cylindrical tube 33 along flow path 77, and flows radially outward through the openings 37 in the lower cylindrical tube 33 and radially outward through the second filter medium 35 along flow path 78. Thereafter, fluid passes into the canister space 82 between an inner surface of the body portion of the canister 14 and an outer surface of the second filter medium 35. In this exemplary configuration, the second filter medium 35 may include a coalescing-type media that promotes separation of a first fluid from a second fluid as the fluid passes through the second filter medium 35, such that the first fluid coalesces and forms droplets of the first fluid on the downstream surface of the second filter medium 35 (e.g., the outer surface of the second filter media 35). Thereafter, the droplets of the first fluid in the canister space 82, pulled by gravity, may drop down into the bottom of the canister 14 for collection in a collection bowl. The remaining fluid, including the second fluid and any remaining first fluid following coalescing, may flow upward along flow path 79 in a direction opposite the direction of the droplets via the canister space 82, and radially inward along flow path 81 into the first filter medium 34. In the exemplary embodiment shown in FIG. 1, the first filter medium 34 may be a barrier-type media that prevents the first fluid from entering the first filter medium 34, such that droplets of the first fluid form on the upstream surface of the first filter medium (e.g., the outer surface of the first filter medium 34). For example, according to some embodiments, the first fluid may be water, and the barrier-type media may include hydrophobic material that repels water. Thereafter, the droplets of the first fluid in the canister space 82, pulled by gravity, may drop down into the bottom of the canister 14 for collection in a collection bowl. Thereafter, the second fluid, separated from the first fluid, passes through the first filter medium 34, through apertures 37 in the upper cylindrical tube 36 into the space between the inner tube 92 and the upper cylindrical tube 36 and upward to exit through the annular outlet port 26 in the filter base 12 and return to the fluid system.

In the exemplary embodiment shown in FIG. 1, the inner tube 92 and the intermediate barrier 72 are configured to prevent fluid from passing through the upper first filter medium 34 without first passing through the lower second filter medium 35. In this exemplary configuration, the fluid to be filtered is forced to pass through both the first filter medium 34 and the second filter medium 35 before returning to the fluid system. In this exemplary configuration, contaminates such as particulates and water are filtered from the fluid.

One or both of the first filter medium 34 and the second filter medium 35 may be configured to trap particulates and/or other particles suspended within a fluid and may include a generally cylindrical shape disposed about and extending along the longitudinal axis 18. The filter element 16 may also include a second endcap 38. The upper cylindrical tube 36 may include a generally cylindrical tube disposed radially within or radially outside of the upper filter medium 34 and may include one or more perforations 37 therein configured to allow fluid to flow therethrough, e.g., from the upper filter medium 34 to an interior space defined between the inner diameter of the upper cylindrical tube 36 and the outer diameter of the inner tube 92. A first, upper end of the upper cylindrical tube 36, disposed adjacent the base 12, may be engaged with, i.e., contact, the first endcap 32 and a second, lower end of the upper cylindrical tube 36 may be engaged with, i.e., contact, the intermediate barrier 72. An upper end of the lower cylindrical tube 33 may be engaged with the intermediate barrier 72 and a lower end of the lower cylindrical tube 33 may be engaged with the second endcap 38 disposed adjacent the end wall 30 of the canister 14 and may be configured to support the lower filter medium 35 within, and with respect to, canister 14. The second endcap 38 may engage an interior surface of the outer wall 28 and/or end wall 30 of canister 14, or may be spaced at least in part from the outer wall 28 and/or end wall 30 of the canister 14 to allow filtered fluid to drop down into the bottom of the canister 14 for collection in a collection bowl. The filter medium 34, 35 may include any filter material and/or medium known in the art, such as, for example, fabric or other porous material, and may or may not be pleated. The first and second endcaps 32, 38 and upper and lower cylindrical tubes 36, 33 may be made from any suitable material, such as, for example, a polymer or other plastic, and may be injection molded. The perforations 37 in the tubes may be any shape, size, and/or quantity. Alternative embodiments of filter element 16 may have only one cylindrical tube disposed in the center of one annular filter media, with no intermediate barrier and with a different arrangement of inlet and outlet ports in the filter base 12 such that unfiltered fluid may be introduced through an inlet port to flow downward along the entire inner diameter of the cylindrical tube and flow radially outward through the annular filter media and upward along the outer periphery of the annular filter media, or introduced through an annular inlet port to flow downward along the outer periphery of the annular filter media in between the canister and the filter media and flow radially inward through the annular filter media and upward through the center of the cylindrical tube disposed in the center of the annular filter media.

With reference to FIG. 2C, the base 12 may include a plate 120 with the inlet port 24 and the outlet port 26 formed therethrough, for example, by a radially outer cylindrical boss 122 extending axially downward toward the canister 14 from the plate 120 and a radially inner cylindrical boss 124 extending downward toward the canister 14 from the plate 120, with the inlet port 24 being formed within the radially inner cylindrical boss 124 and the outlet port 26 being formed as an annular space between the radially inner cylindrical boss 124 and the radially outer cylindrical boss 122. The upwardly protruding central flange 52 of the first endcap 32 may include an outer seal member (O-ring) 44 supported within a groove formed around an outer peripheral surface of the flange and configured to provide a fluid seal between the radially outer cylindrical boss 122 of the base 12, the filter element 16, and the outlet port 26. The inner tube 92 of the filter element 16 may include an inner seal member (O-ring) 42 supported within a groove formed around an outer peripheral surface of a top end of the inner tube 92 and configured to provide a fluid seal between the radially inner cylindrical boss 124 of the base 12, the filter element 16 and the inlet port 24. The endcap 32 may or may not be fixedly connected to filter medium 34 and/or may include any apparatus configured to establish fluid seals with respect to base 12 and inlet port 24 and outlet port 26, such as, for example, an adaptor configured to interconnect a top-plate and/or another endcap to base 12 via a threaded connection.

As best seen in the cross-sectional elevation view of FIG. 2C, the annular plate member 46 of top endcap 32 may be configured to be mounted and molded to a top axial end surface of the annular filter medium 34 positioned around the upper cylindrical tube 36 of the filter element 16 in the filter system 10. The annular plate member 46 may include a radially inner portion, a radially outer portion, and the central axis of the annular plate member 46 defining the longitudinal axis 18. The radially inner flange 50 projects axially along the longitudinal axis 18 in a first direction from the radially inner edge of the annular plate member 46. The central flange 52 projects axially along the longitudinal axis 18 in a second direction opposite to the first direction from the annular plate member 46 at a convergence of the radially inner portion and the radially outer portion. The radially outer flange 48 projects axially along the longitudinal axis 18 in the first direction from the radially outer edge of the annular plate member 46.

Figure 4:
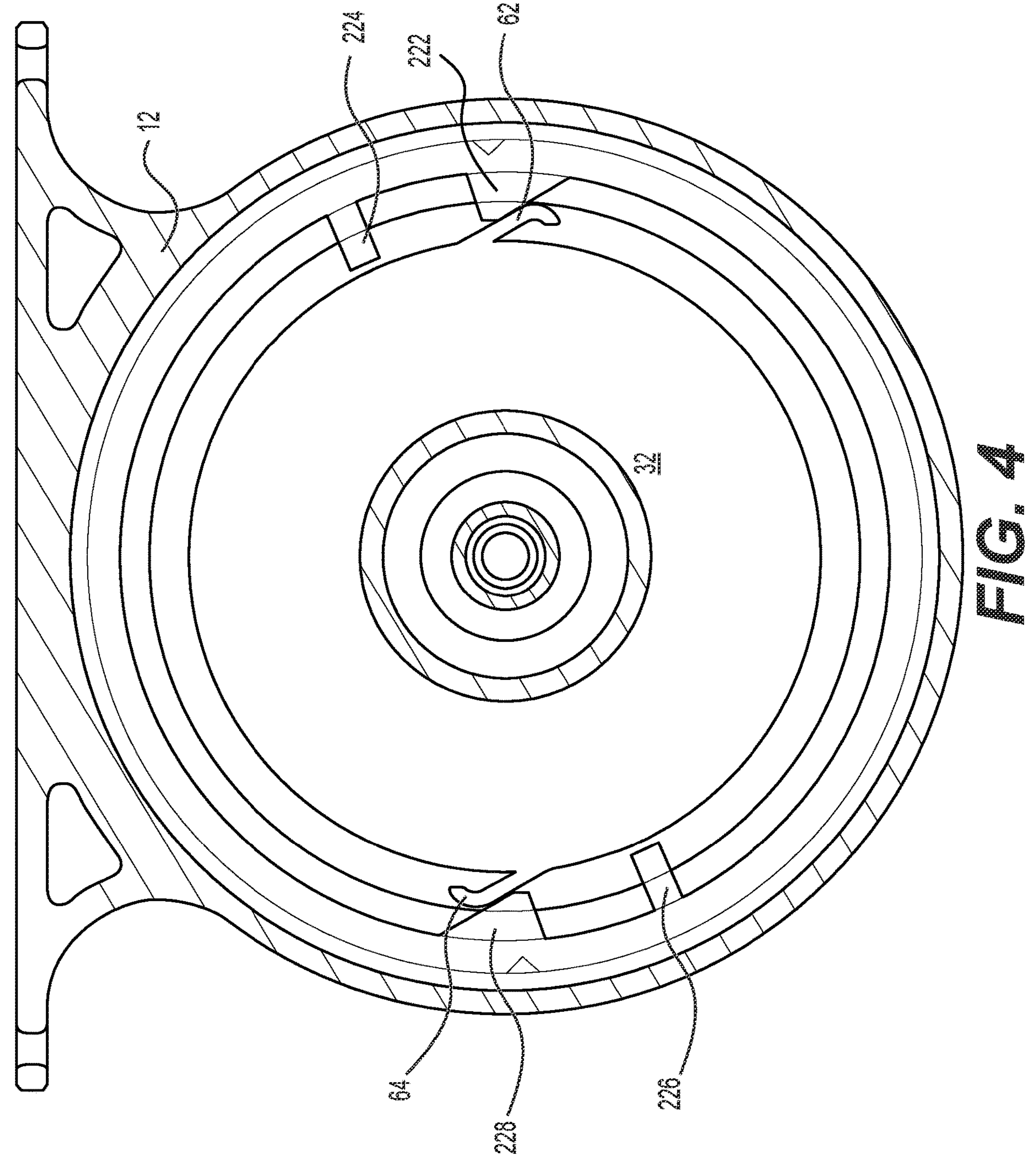
FIG. 4 is a top plan view showing the winglets of the filter element of FIG. 3 beginning to deflect as they engage with radially inwardly projecting wedge-shaped protrusions on the filter base during filter element installation.
Figure 5:
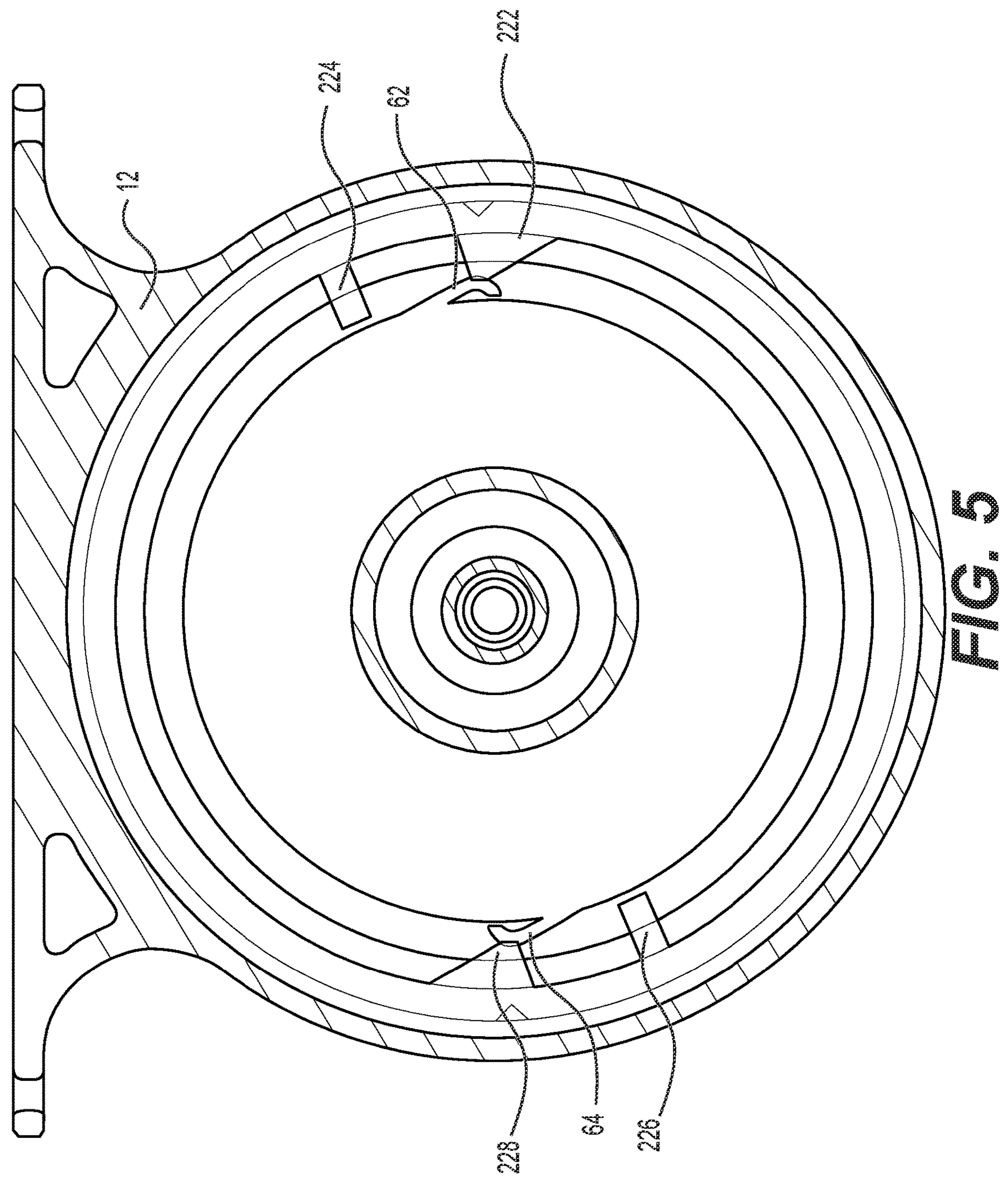
FIG. 5 is a top plan view showing the winglets of the filter element of FIG. 3 fully deflected to pass by the wedge-shaped protrusions on the filter base during filter element installation.
Figure 6:
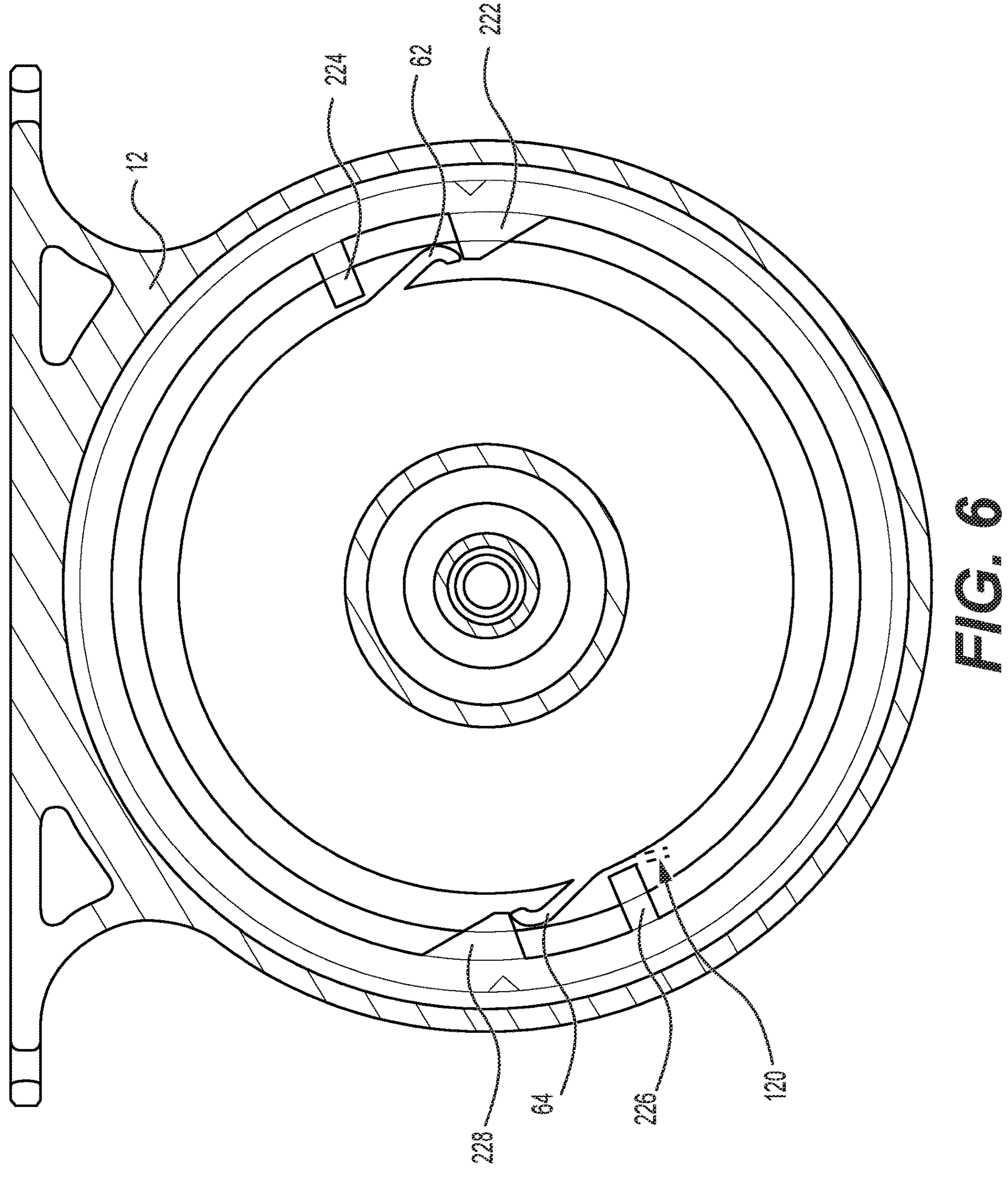
FIG. 6 is a top plan view showing the winglets of the filter element of FIG. 3 after the filter element has been fully installed in the filter base and the winglets have returned to their undeflected position between the radially inwardly projecting wedge-shaped protrusions and circumferentially adjacent radially inwardly projecting backstop protrusions.
Figure 7:
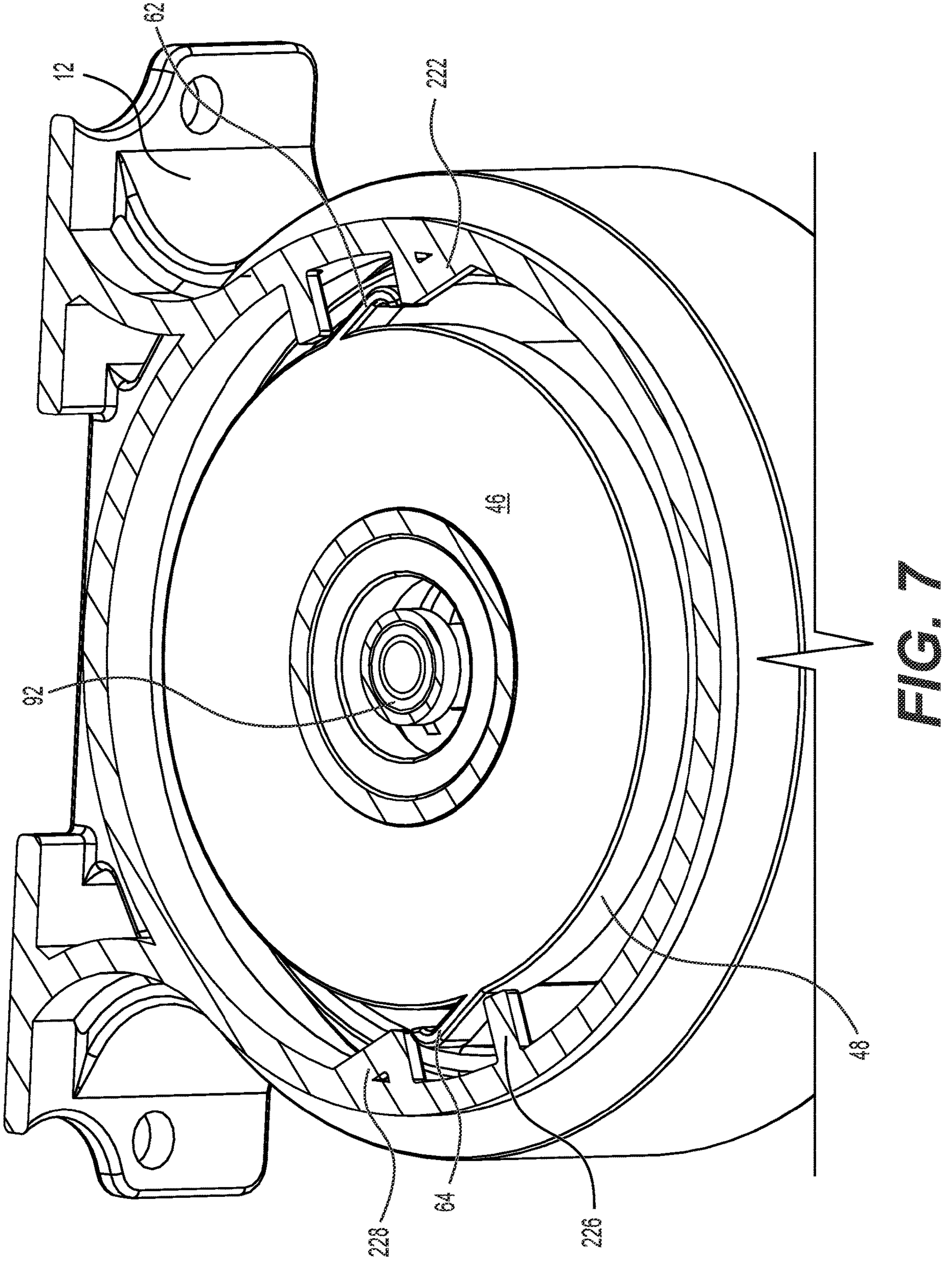
FIG. 7 is a top isometric view of the filter element of FIG. 6.
Figure 8:
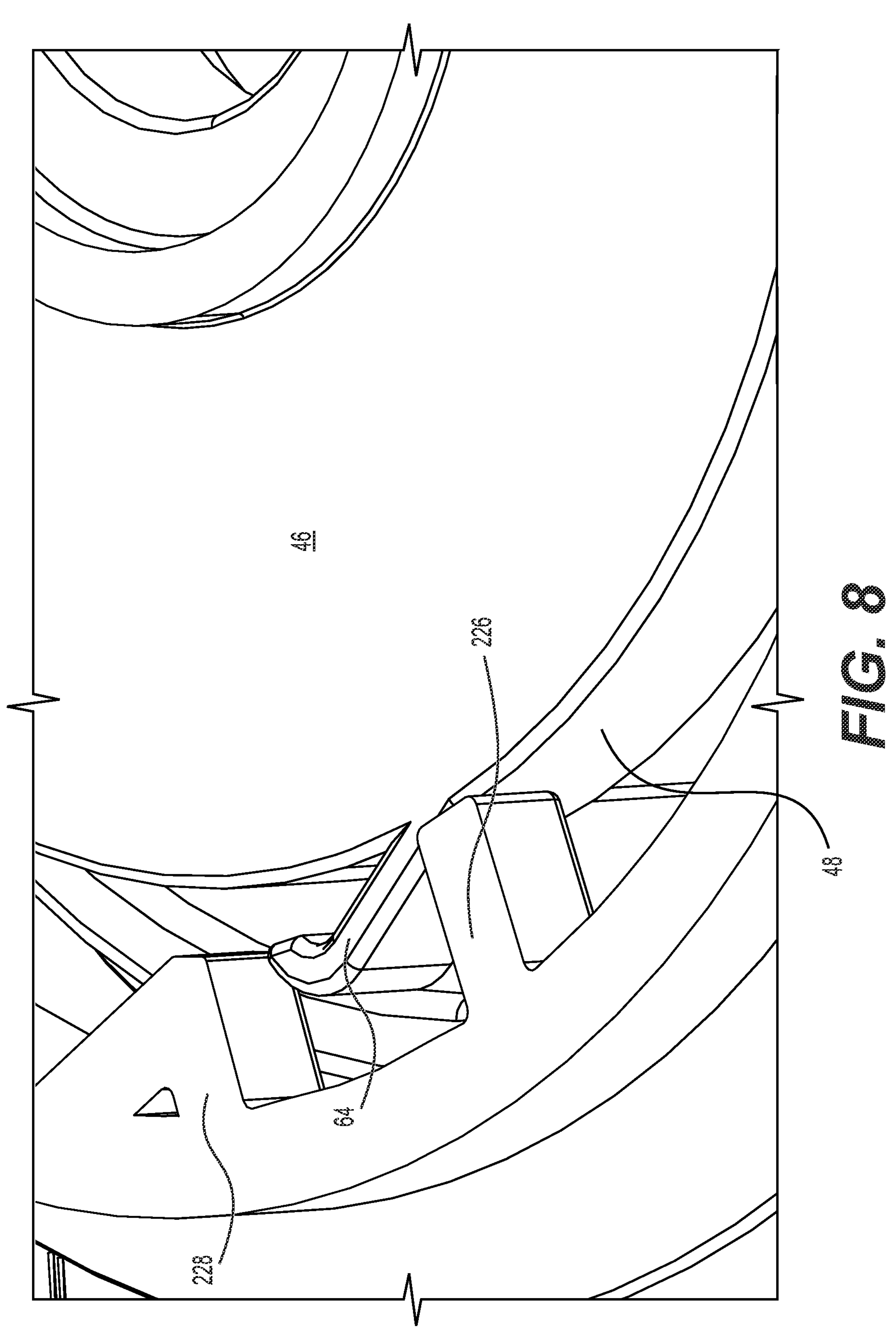
FIG. 8 is an enlarged view of a portion of FIG. 7.

The radially outer flange 48 of the top endcap 32 may include at least one winglet feature 62, 64, as best seen in FIGS. 3-8, extending radially outward in a cantilever fashion from an outer circumferential surface of the radially outer flange 48 in a direction opposite to a direction in which the filter element 16 is rotated during installation to the filter base 12 of the filter system 10. Similarly, the spin-on cartridge 100 of FIG. 9 may include a single winglet feature, or the plurality of diametrically-opposed winglet features 162, 164 extending radially outward in a cantilever fashion from an outer circumferential surface of an annular flange extending axially from an annular plate member of the top endcap-like portion 132 of the spin-on cartridge 100. The at least one winglet feature 62, 64 of the top endcap 32 may be configured to deflect toward the outer circumferential surface of the radially outer flange 48 of the top endcap 32 of the filter element 16 through contact with a wedge-shaped protrusion 222, 228 projecting radially inwardly from an inner circumference of the filter base 12 as the filter element 16 is rotatably installed into the filter base 12. FIGS. 4 and 5 illustrate two winglet features 62, 64 extending radially outward from an outer circumferential surface of the radially outer flange 48 and deflecting radially inward toward the outer circumferential surface of the radially outer flange 48 as the filter element is rotate in a counterclockwise direction, with each of the winglet features 62, 64 contacting the respective wedge-shape protrusions 222, 228. The counterclockwise rotation of the filter element 16, as viewed in FIGS. 4-8, occurs as the canister 14 with filter element 16 is threadedly engaged with the base 12 and moves axially toward the filter base 12 while being rotated in a clockwise direction as viewed from the canister 14 looking toward the filter base 12. When the winglet features 62, 64 have deflected and moved past the respective wedge-shaped protrusions 222, 228, as shown in FIGS. 6, 7, and 8, each of the winglet features 62, 64 is configured to spring back to its undeflected configuration, providing tactile and auditory feedback indicative of the filter element 16 being properly installed into the filter base 12. Similarly, each of the winglet features 162, 164 protruding radially outwardly from an outer circumferential surface of the annular flange that extends axially from the top annular end plate of the spin-on cartridge 100 deflects radially inwardly and moves past the wedge-shaped protrusion(s) 328 as the spin-on cartridge 100 is threadedly engaged with the internal threads 321 of the filter base 312, and then the winglet features 162, 164 spring back to an undeflected configuration, providing tactile and auditory feedback indicative of the spin-on cartridge 100 being properly installed into the filter base 312.

At the point where the winglet features 62, 64 have sprung back to their undeflected positions and are located circumferentially in between the respective wedge-shaped protrusions 222, 228 and associated backstop protrusions 224, 226, the canister 14 with filter element 16 has been threadedly installed far enough into the outer wall 20 of the filter base 12 such that a canister seal member (O-ring) 56 has sealed against an inner circumferential surface of the outer wall 20 of the filter base 12. Similarly, at the point when the winglet features 162, 164 of the spin-on cartridge 100 have sprung back to their undeflected positions and are located circumferentially in between the wedge-shaped protrusion 328 and associated backstop protrusion 326, the spin-on cartridge 100 has been threadedly installed far enough into the outer wall 320 of the filter base 312 to form a properly sealed engagement between the spin-on cartridge 100 and the filter base 312. In one exemplary embodiment, as shown in FIGS. 9 and 10, one or more annular seals may protrude axially from a top surface of the top annular end plate of the spin-on cartridge 100, and may be configured to seat against mating annular flanges extending axially from the filter base 312 when the spin-on cartridge 100 is fully engaged into the filter base 312.

At the fully engaged position of the canister 14 and filter element 16 into the filter base 12, the upwardly protruding central flange 52 of the first endcap 32 and the outer seal member (O-ring) 44 supported within a groove formed around an outer peripheral surface of the central flange 52 provide a fluid seal between the radially outer cylindrical boss 122 of the base 12, the filter element 16, and the outlet port 26. The inner tube 92 of the filter element 16 and the inner seal member (O-ring) 42 supported within a groove formed around an outer peripheral surface of a top end of the inner tube 92 provide a fluid seal between the radially inner cylindrical boss 124 of the filter base 12, the filter element 16 and the inlet port 24. One of ordinary skill in the art will recognize that other arrangements, types, and numbers of seals may be provided in order to ensure a fluid-tight connection between the canister 14, the filter element 16, and the filter base 12, or between the spin-on style cartridge 100 and the filter base 312.

As best seen in FIGS. 2B and 3-8, each winglet feature 62, 64 may include a straight proximal portion connected to the radially outer flange 48 at an acute angle to the outer circumferential surface of the radially outer flange 48, and a curved distal portion. The curved distal portion of each of the winglet features curves radially inwardly from a distal end of the straight proximal portion toward the radially outer flange 48. In some exemplary embodiments, a width of each of the winglet features may be approximately equal to the width of the radially outer flange 48. The configuration of the winglet features 62, 64 enables each winglet feature to deflect and pass by the radially inner edge of a respective wedge-shaped protrusion 222, 228 as the filter element 16 moves rotatably and axially during tightening into the filter base through the threaded engagement of the canister 14 and the filter base 12. The curved distal portion of each winglet feature may be configured such that the angle of contact between the curved distal portion and a first angled surface of the respective wedge-shaped protrusion contacted by the winglet feature as the filter element is rotated in a first direction to be tightened into the filter base 12 is smaller than the angle of contact between the curved distal portion and a second angled surface of the respective wedge-shaped protrusion contacted by the winglet feature as the filter element is rotated in an opposite second direction to be loosened from the filter base 12, as best seen in FIGS. 4-6. This configuration enables the canister and filter element to be tightened into the filter base with less force than the force required to loosen the canister and filter element by reversing the direction of rotation of the filter element and forcing the winglet features to deflect and move back past the respective wedge-shaped protrusions. Similar features may be provided on the filter base 312 for a spin-on style cartridge 100.

As shown in FIG. 6, the gap 230 between the radially inner edge of each backstop protrusion 224, 226 and the outer circumferential surface of the radially outer flange 48 of the top endcap 32 is smaller than the gap between the radially inner edge of each wedge-shaped protrusion 222, 228 and the outer circumferential surface of the radially outer flange 48. The gap 230 is configured to be small enough that the winglet features 62, 64 cannot pass the respective backstop protrusions 224, 226. The circumferential spacing between each wedge-shaped protrusion 222, 228 and the respective backstop protrusion disposed adjacent the wedge-shaped protrusion may be selected to allow for a small amount of rotational play of the filter element 16 after the winglet features 62, 64 have snapped back to their undeflected configurations upon being rotated past the wedge-shaped protrusions in a tightening direction. Reversing the direction of rotation in order to loosen the canister 14 and filter element 16 from the base 12 and move the winglet features 62, 64 back out of the circumferential spaces in between each wedge-shaped protrusion 222, 228 and the respective backstop protrusions 224, 226 requires more force than the force required to tighten the canister 14 and the filter element 16. Nonetheless, when sufficient torque is provided for loosening the canister 14 and the filter element 16 from the base 12, the curved distal portion of each winglet feature 62, 64 deflects radially inward in order to allow rotation of the canister and filter element back past the wedge-shaped protrusions.

INDUSTRIAL APPLICABILITY

The disclosed fluid filter system may be applicable to filter any type of fluid and may provide a seal between a flow of unfiltered fluid and a flow of filtered fluid while also providing tactile and auditory feedback to an operator such that the operator knows when a replacement canister and filter element have been properly installed into a filter base on a machine.

The filter system 10, shown, for example, in FIG. 2C, or a filter system including the spin-on style cartridge 100 may include the filter base 12, 312 configured for connection of the filter system to a vehicle or other machine. The filter base 12, 312 may include the inlet port 24, 324 for introduction of unfiltered fluid and the outlet port(s) 26, 326 for discharge of filtered fluid. The filter base 12, 312 may also include the wedge-shaped protrusions 222, 228, 328 projecting radially inwardly from an inner circumference of the filter base 12, 312 on diametrically opposed sides of the filter base 12, 312 and respective backstop protrusions 224, 226, 326 circumferentially spaced from the wedge-shape protrusions 222, 228, 328 and projecting radially inwardly from the inner circumference of the filter base 12, 312.

The canister 14 of the filter system 10 may be threadedly engaged with the filter base 12, with external threads 31 at a top end of the canister 14 being configured to threadedly engage with internal threads 21 along the outer wall 20 of the filter base 12. The filter element 16 may be removably contained within the canister 14 in a cartridge-type filter system, or permanently installed into the canister 14 in a "spin-on" type filter system, such as shown in FIGS. 9 and 10, wherein the entire canister and filter element are integrally assembled into a disposable cartridge 100, and are disposed of each time the filter element is replaced.

The filter element 16 may include an annular filter medium, which in some embodiments may consist of a first annular filter medium 34 of a first type (e.g., coalescing-type or barrier-type) and a second annular filter medium 35 of a second type. A center tube around which the annular filter medium is disposed may consist of an upper cylindrical tube 36 and a lower cylindrical tube 33 separated by an intermediate barrier 72. The bottom endcap 38 may be disposed on a first axial end surface of the filter medium 35, and the top endcap 32 may be disposed on a second axial end surface of the annular filter medium 34.

The top endcap 32 may include the annular plate member 46 configured to be mounted and/or molded to the second axial end surface of the annular filter medium 34 positioned around the upper cylindrical tube 36 of the filter element 16. The annular plate member 46 may include a radially inner portion, a radially outer portion, and the central axis of the annular plate member 46 defining the longitudinal axis 18. The radially inner flange 50 of the radially inner portion of the annular plate member 46 may project axially along the longitudinal axis 18 in a first direction from the radially inner edge of the annular plate member 46. The central flange 52 may project axially along the longitudinal axis 18 in a second direction opposite to the first direction from the annular plate member 46 at a convergence of the radially inner portion and the radially outer portion. The radially outer flange 48 of the radially outer portion of the annular plate member 46 may project axially along the longitudinal axis 18 in the first direction from the radially outer edge of the annular plate member 46.

The radially outer flange 48 may include at least one winglet feature 62, 64 extending radially outward in a cantilever fashion from an outer circumferential surface of the radially outer flange 48 in a direction opposite to a direction in which the filter element 16 is rotated during installation into the filter base 12 of the filter system 10. The at least one winglet feature 62, 64 may be configured to deflect toward the outer circumferential surface of the radially outer flange 48 of the filter element 16 through contact with the wedge-shaped protrusion 222, 228 as the filter element 16 is rotatably installed into the filter base 12. A first gap between a radially inner edge of the wedge-shaped protrusion 222, 228 and the outer circumferential surface of the radially outer flange 48 may be large enough to allow the at least one winglet feature 62, 64 to pass by the wedge-shaped protrusion 222, 228 as the filter element 16 contained within the canister 14 is rotatably installed into the filter base 12.

The at least one winglet feature 62, 64 may be configured to spring back to its undeflected configuration after passing the respective wedge-shaped protrusion 222, 228 and before contacting the respective backstop protrusion 224, 226, providing tactile and auditory feedback indicative of the filter element 16 being properly installed into the filter base 12. Similarly, as discussed above, the winglet features 162, 164 of the spin-on style cartridge 100, which may protrude radially outwardly in a cantilever fashion from an outer circumferential surface of a radially outer annular flange that extends axially from a top annular end plate of the cartridge 100, may be configured to spring back to an undeflected configuration after passing the wedge-shaped protrusion(s) 328 and before contacting the backstop protrusion(s) 326, providing tactile and auditory feedback indicative of the spin-on style cartridge 100 being properly installed into the filter base 312. A first gap between a radially inner edge of the wedge-shaped protrusion 328 and the outer circumferential surface of the spin-on style cartridge 100 may be large enough to allow the at least one winglet feature 162, 164 to pass by the wedge-shaped protrusion 328 as the cartridge 100 is rotatably installed into the filter base 312.

A second gap 230 (see FIG. 6) between a radially inner edge of the backstop protrusion 224, 226 and the outer circumferential surface of the radially outer flange 48 may be smaller than the first gap and small enough to prevent the at least one winglet feature 62, 64 from passing the respective backstop protrusion 224, 226.

As discussed above, at the point where the winglet features 62, 64, 162, 164 have sprung back to their undeflected positions, thus generating tactile and auditory feedback, they are located circumferentially in between the respective wedge-shaped protrusions 222, 228, 328 and associated backstop protrusions 224, 226, 326. At this point the canister 14 with filter element 16 or spin-on style cartridge 100 has been threadedly installed far enough into the outer wall 20 of the filter base 12 or the outer wall 320 of the filter base 312 such that the canister seal member (O-ring) 56 has sealed against an inner circumferential surface of the outer wall 20 of the filter base 12, or the spin-on style cartridge 100 has formed a fluid-tight seal against the filter base 312. At this fully engaged position, the upwardly protruding central flange 52 of the first endcap 32 and the outer seal member (O-ring) 44 supported within a groove formed around an outer peripheral surface of the central flange 52 provide a fluid seal between the radially outer cylindrical boss 122 of the filter base 12, the filter element 16, and the annular outlet port 26. The inner tube 92 of the filter element 16 and the inner seal member (O-ring) 42 supported within a groove formed around an outer peripheral surface of a top end of the inner tube 92 provide a fluid seal between the radially inner cylindrical boss 124 of the filter base 12, the filter element 16 and the inlet port 24.

It will be apparent to those skilled in the art that various modifications and variations can be made to the disclosed fluid filter system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. An endcap for a filter element, the endcap comprising:

an annular plate member disposed adjacent an axial end surface of an annular filter medium of the filter element;

a radially outer annular flange projecting axially from a surface of the annular plate member;

the radially outer annular flange including at least one winglet feature extending radially outwardly in a cantilever fashion from an outer circumferential surface of the radially outer annular flange in a direction such that the at least one winglet feature forms an acute angle with the outer circumferential surface on a clockwise side of the at least one winglet feature when viewed along a perspective line extending from a side of the annular plate member opposite from the annular filter medium toward the at least one winglet feature, with the at least one winglet feature being configured to deflect toward the outer circumferential surface of the radially outer annular flange through contact with a wedge-shaped protrusion projecting radially inwardly from an inner circumference of a filter base of a filter system as the filter element is simultaneously moved axially and rotatably when being threadedly engaged into the filter base, and spring back to its undeflected configuration after passing the wedge-shaped protrusion.

2. The endcap of claim 1, wherein the at least one winglet feature comprises two winglet features extending radially outward from diametrically opposite sides of the radially outer annular flange, and wherein the spring back of the winglet features provides one or more of tactile and auditory feedback indicative of the filter element being properly installed into the filter base.

3. The endcap of claim 2, wherein the two winglet features extend radially outwardly from diametrically opposite sides of the radially outer annular flange in tangentially opposite directions from each other.

4. The endcap of claim 1, wherein the at least one winglet feature includes a straight proximal portion connected to the radially outer annular flange and a curved distal portion.

5. The endcap of claim 4, wherein the curved distal portion of the at least one winglet feature curves radially inwardly from a distal end of the straight proximal portion toward the radially outer annular flange.

6. The endcap of claim 1, wherein the at least one winglet feature has a width that is approximately equal to the width of the radially outer annular flange.

7. The endcap of claim 1, wherein the annular plate member includes a centrally located flange projecting axially from the annular plate member, and the centrally located flange includes an annular seal member disposed adjacent a distal end of the centrally located flange and retained in a radially outwardly facing groove formed around an outer circumferential surface of the centrally located flange, the annular seal member being configured to provide a radially facing seal interface with respect to a radially facing surface associated with an outlet formed in the filter base.

8. The endcap of claim 1, wherein the annular plate member includes a radially inner annular flange projecting from the annular plate member and being configured to extend axially within an inner diameter of the annular filter medium and the radially outer annular flange is configured to overlap with a top end of a radially outer circumferential surface of the annular filter medium.

9. The endcap of claim 1, wherein the at least one winglet feature is molded integrally with the radially outer annular flange of the endcap.

10. A filter element, comprising:

an annular filter medium;

an endcap including an annular plate member disposed adjacent an axial end surface of the annular filter medium;

a radially outer annular flange projecting axially from a surface of the annular plate member;

the radially outer annular flange including at least one winglet feature extending radially outwardly in a cantilever fashion from an outer circumferential surface of the radially outer annular flange in a direction such that the at least one winglet feature forms an acute angle with the outer circumferential surface on a clockwise side of the at least one winglet feature when viewed along a perspective line extending from a side of the annular plate member opposite from the annular filter medium toward the at least one winglet feature, with the at least one winglet feature being configured to deflect toward the outer circumferential surface of the radially outer annular flange through contact with a wedge-shaped protrusion projecting radially inwardly from an inner circumference of a filter base of a filter system as the filter element is simultaneously moved axially and rotatably when being threadedly engaged into the filter base, and spring back to its undeflected configuration after passing the wedge-shaped protrusion.

11. The filter element of claim 10, wherein the at least one winglet feature comprises two winglet features extending radially outwardly from diametrically opposite sides of the radially outer annular flange, and wherein the spring back of the winglet features provides tactile and auditory feedback indicative of the filter element being properly installed into the filter base.

12. The filter element of claim 11, wherein the two winglet features extend radially outwardly from diametrically opposite sides of the radially outer annular flange in tangentially opposite directions from each other.

13. The filter element of claim 10, wherein the at least one winglet feature includes a straight proximal portion connected to the radially outer annular flange and a curved distal portion.

14. The filter element of claim 13, wherein the curved distal portion of the at least one winglet feature curves radially inwardly from a distal end of the straight proximal portion toward the radially outer annular flange.

15. The filter element of claim 10, wherein the at least one winglet feature has a width that is approximately equal to the width of the radially outer annular flange.

16. The filter element of claim 10, wherein the annular plate member includes a centrally located flange projecting axially from the annular plate member, and the centrally located flange includes an annular seal member disposed adjacent a distal end of the centrally located flange and retained in a radially outwardly facing groove formed around an outer circumferential surface of the centrally located flange, the annular seal member being configured to provide a radially facing seal interface with respect to a radially facing surface associated with an outlet formed in the filter base.

17. The filter element of claim 10, wherein the annular plate member includes a radially inner annular flange projecting from the annular plate member and being configured to extend axially within an inner diameter of the annular filter medium and the radially outer annular flange is configured to overlap with a top end of a radially outer circumferential surface of the annular filter medium.

18. The filter element of claim 10, wherein the at least one winglet feature is molded integrally with the radially outer annular flange of the endcap.

19. A filter system, comprising:

a filter base configured for connection of the filter system to a vehicle or other machine, the filter base including:

an inlet port for introduction of unfiltered fluid, an outlet port for discharge of filtered fluid, a wedge-shaped protrusion projecting radially inwardly from an inner circumferential surface of the filter base, and a backstop protrusion circumferentially spaced from the wedge-shaped protrusion and projecting radially inwardly from the inner circumferential surface of the filter base; and a filter cartridge containing an annular filter medium being connected to the filter base, a top endcap of the filter cartridge is disposed at one axial end of the annular filter medium, the top endcap includes a radially outer annular flange projecting axially from the top endcap, the radially outer annular flange includes at least one winglet feature extending radially outwardly in a cantilever fashion from an outer circumferential surface of the radially outer annular flange in a direction such that the at least one winglet feature forms an acute angle with the outer circumferential surface on a clockwise side of the at least one winglet feature when viewed along a perspective line extending from a side of the top endcap opposite from the annular filter medium toward the at least one winglet feature, the at least one winglet feature is configured to deflect toward the outer circumferential surface of the radially outer annular flange through contact with the wedge-shaped protrusion as the filter cartridge is simultaneously moved axially and rotatably when being threadedly engaged into the filter base, and the at least one winglet feature is configured to spring back to its undeflected configuration after passing the wedge-shaped protrusion and before contacting the backstop protrusion.

20. The filter system of claim 19, wherein the at least one winglet feature comprises two winglet features extending radially outwardly from diametrically opposite sides of the radially outer annular flange, and wherein the spring back of the winglet features provides tactile and auditory feedback indicative of the filter element being properly installed into the filter base.

* * * * *